(12) United States Patent
Harrell et al.

(10) Patent No.: US 8,644,113 B2
(45) Date of Patent: Feb. 4, 2014

(54) SOUND-BASED POSITIONING

(75) Inventors: Michael Riley Harrell, Boulder, CO (US); William Hayden Connor, Boulder, CO (US); Marzban R. Palsetia, Boulder, CO (US); John Charles Curlander, Boulder, CO (US); Heinrich Frick, Boulder, CO (US); Jesse Wright, Boulder, CO (US); Mark Joseph Barkmeier, Golden, CO (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 13/250,482

(22) Filed: Sep. 30, 2011

(65) Prior Publication Data

US 2013/0083631 A1     Apr. 4, 2013

(51) Int. Cl.
*G01S 3/80* (2006.01)

(52) U.S. Cl.
USPC ............................................. 367/127; 367/118

(58) Field of Classification Search
USPC ............................................................. 367/127
See application file for complete search history.

(56) References Cited

U.S. PATENT DOCUMENTS

| | | | | |
|---|---|---|---|---|
| 5,528,232 | A * | 6/1996 | Verma et al. | 340/8.1 |
| 5,928,309 | A * | 7/1999 | Korver et al. | 701/470 |
| 7,328,088 | B2 | 2/2008 | Kim et al. | |
| 2002/0021773 | A1 | 2/2002 | Henriksson | |
| 2003/0142587 | A1* | 7/2003 | Zeitzew | 367/127 |
| 2005/0113110 | A1 | 5/2005 | Joo et al. | |
| 2006/0210101 | A1 | 9/2006 | Ishibashi et al. | |
| 2007/0070812 | A1 | 3/2007 | Lee | |
| 2007/0282565 | A1* | 12/2007 | Bye et al. | 702/158 |
| 2009/0316529 | A1 | 12/2009 | Huuskonen et al. | |
| 2010/0007485 | A1 | 1/2010 | Kodrin et al. | |
| 2011/0028160 | A1 | 2/2011 | Roeding et al. | |
| 2011/0029359 | A1 | 2/2011 | Roeding et al. | |
| 2011/0029362 | A1 | 2/2011 | Roeding et al. | |
| 2011/0029364 | A1 | 2/2011 | Roeding et al. | |
| 2011/0029370 | A1 | 2/2011 | Roeding et al. | |

FOREIGN PATENT DOCUMENTS

| | | |
|---|---|---|
| JP | 2008-051564 A | 3/2008 |
| KR | 10-1040181 B1 | 6/2011 |

OTHER PUBLICATIONS

International Search Report, Mailed Date: Feb. 27, 2013, Application No. PCT/US2012/054533, Filed date: Sep. 10, 2012, pp. 9.
Priyantha, et a., "The Cricket Location-Support System" MIT Laboratory for Computer Science, Cambridge, MA Copyright ACM 2000 1-58113-197-6/00/08, pp. 32-43.
"Skyhook: How it Works > Overview" http://www.skyhookwireless.com/howitworks/ 2 pages, Sep. 29, 2011.

(Continued)

*Primary Examiner* — Isam Alsomiri
*Assistant Examiner* — Hovhannes Baghdasaryan

(57) ABSTRACT

A receiving device captures sounds signals (e.g., ultrasonic) from multiple sound signal sources, selects the sound signals satisfying a reliability condition for use in determining an initial position of the receiving device relative to the corresponding sound signal sources, determines the initial position of the receiving device using multilateration of the selected sound signals, and updates the current position of the receiving device as the reliability of individual sound signals varies in the presence of dynamically changing environmental interference, multipathing, and movement between the receiving device and the sound signal sources.

17 Claims, 6 Drawing Sheets

(56) References Cited

OTHER PUBLICATIONS

Yi et al., "Autonomous Navigation of Indoor Mobile Robot Using Global Ultrasonic System," Robotica, vol. 22 Issue 4, Aug. 2004, Republic of Korea, pp. 369-374, http://www.intechopen.com/source/pdfs/145/InTech-Autonomous_navigation_of_indoor_mobile_robot_using_global_ultrasonic_systems.pdf.

Jimenez, A.R., et al., Abstract—"Ultrasonic Localization Methods for Accurate Positioning," Instituto de Automatica Industrial, Madrid, Spain, Sep. 29, 2005, pp. 1-17, http://iai.csis.es/lopsi/static/publicaciones/Libro/ConfIA-Antonio.pdf.

Alvarez, et al., "Analysis of the Performance of an Ultrasonic Local Positioning System based on the emission of Kasami codes," 2010 International Conference on Indoor Positioning and Indoor Navigation (IPIN), Sep. 15-17, 2010, Zurich, Switzerland, 978-1-4244-5864-6/10 IEEE, 5 pages.

Alloulah, Mohammed, et al., Abstract—"Indoor Position Sensing Using Broadband Ultrasound," Computing Department, Lancaster University, Sep. 15, 2010, 2010 International Conference on Indoor Positioning and Indoor Navigation (IPIN), http://www.geometh.ethz.ch/ipin/program/Ultra_Sound_Systems, pp. 415-416.

Schweinzer, Herbert, Abstract—"LOSNUS: An Ultrasonic System Enabling High Accuracy and Secure TDoA Locating of Numerous Devices," Vienna University of Technology, Vienna, Austra, Sep. 15, 2010, 2010 International Conference on Indoor Positioning and Indoor Navigation (IPIN), http://www.geometh.ethz.ch/ipin/program/Ultra_Sound_Systems, pp. 417-418.

Filonenko, Viacheslav, et al., Abstract—"Accurate indoor positioning for mobile phones using ultrasound," Dublin Institute of Technology, Ireland, Sep. 15, 2010, 2010 International Conference on Indoor Positioning and Indoor Navigation (IPIN), http://www.geometh.ethz.ch/ipin/program/Ultra_Sound_Systems, pp. 419-420.

Holm, Sverre, et al., Abstract—"Robust ultrasonic indoor positioning using transmitter arrays," Department of Informatics, University of Oslo, Norway, Sep. 15, 2010, 2010 International Conference on Indoor Positioning and Indoor Navigation (IPIN), http://www.geometh.ethz.ch/ipin/program/Ultra_Sound_Systems, pp. 421-422.

Mizutani, Kyohei, et al., Abstract—"Fast and Accurate Ultrasonic 3D Localization Using the TSaT-MUSIC Algorithm," University of Tokyo, Sep. 15, 2010, 2010 International Conference on Indoor Positioning and Indoor Navigation (IPIN), http://www.geometh.ethz.ch/ipin/program/Ultra_Sound_Systems, pp. 423-425.

Wan, Eric A., et al., Abstract—"A tag-free solution to unobtrusive indoor tracking using wall-mounted ultrasonic transducers," Department of Biomedical Engineering, Oregon Health & Science University, Beaverton, Oregon, Sep. 15, 2010, 2010 International Conference on Indoor Positioning and Indoor Navigation (IPIN), http://www.geometh.ethz.ch/ipin/program/Ultra_Sound_Systems, pp. 426-4247.

Hernandez, Alvaro, et al., Abstract—"Ultrasonic LPS: architecture, signal processing, positioning and implementation," Electronics Department, University of Alcala, Madrid, Spain, Sep. 15, 2010, 2010 International Conference on Indoor Positioning and Indoor Navigation (IPIN), http://www.geometh.ethz.ch/ipin/program/Ultra_Sound_Systems, pp. 430-431.

Urena, Jesus et al., Abstract—"Ultrasonic LPS: Autocalibration and mobile robot navigation," Electronics.Department, University of Alcala, Madrid, Spain, Sep. 15, 2010, 2010 International Conference on Indoor Positioning and Indoor Navigation (IPIN), http://www.geometh.ethz.ch/ipin/program/Ultra_Sound_Systems, pp. 434-435.

Habib, Ahsan et al., Abstract—"Study of Blue Whale: The Novel Methodology for Indoor Positioning," University of Dhaka, Dhaka, Bangladesh, Electronics Department, University of Alcala, Madrid, Spain, Sep. 15, 2010, 2010 International Conference on Indoor Positioning and Indoor Navigation (IPIN), http://www.geometh.ethz.ch/ipin/program/Ultra_Sound_Systems, pp. 436-437.

Knauth, Stefan et al., "The iLoc ultrasound indoor localisation system with interactive badges," Lucerne University, Horw, Switzerland and Stuttgart University of Applied Sciences, Stuttgart, Germany, Electronics Department, University of Alcala, Madrid, Spain, Sep. 15, 2010, 2010 International Conference on Indoor Positioning and Indoor Navigation (IPIN), http://www.geometh.ethz.ch/ipin/program/Ultra_Sound_Systems, pp. 438-439.

Nakamura, Shigeki, et al., Abstract—"An Accurate Technique for Simultaneous Measurement of 3D Position and Velocity of a Moving Object Using a Single Ultrasonic Receiver Unit," University of Tokyo, Electronics Department, University of Alcala, Madrid, Spain, Sep. 15, 2010, 2010 International Conference on Indoor Positioning and Indoor Navigation (IPIN), http://www.geometh.ethz.ch/ipin/program/Ultra_Sound_Systems, pp. 428-429.

\* cited by examiner

SOUND-BASED POSITIONING

BACKGROUND

Accurately determining the position of a user or mobile device within an indoor setting presents various challenges. For example, global positioning systems (GPS) technologies do not work well within an enclosed building, where the mobile device's communications with the GPS satellites can be impeded by the surrounding structure. Further, available consumer devices are limited in their communication capabilities, sensing capabilities (e.g., mobile device microphones), the accuracy of their internal clocks, available power, etc. Accordingly, obtaining highly accurate, real-time location information on a mobile user within enclosed buildings (or where GPS positioning is otherwise unavailable) is difficult without nontrivial modifications to the hardware of available mobile devices.

SUMMARY

Implementations described and claimed herein address the foregoing problems by using a receiving device to capture sounds signals (e.g., ultrasonic) from multiple sound signal sources, selecting the sound signals satisfying a reliability condition for use in determining an initial position of the receiving device relative to the corresponding sound signal sources, determining the initial position of the receiving device using multilateration of the selected sound signals, and updating the current position of the receiving device as the reliability of individual sound signals varies in the presence of dynamically changing environmental interference, multipathing, and movement between the receiving device and the sound signal sources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
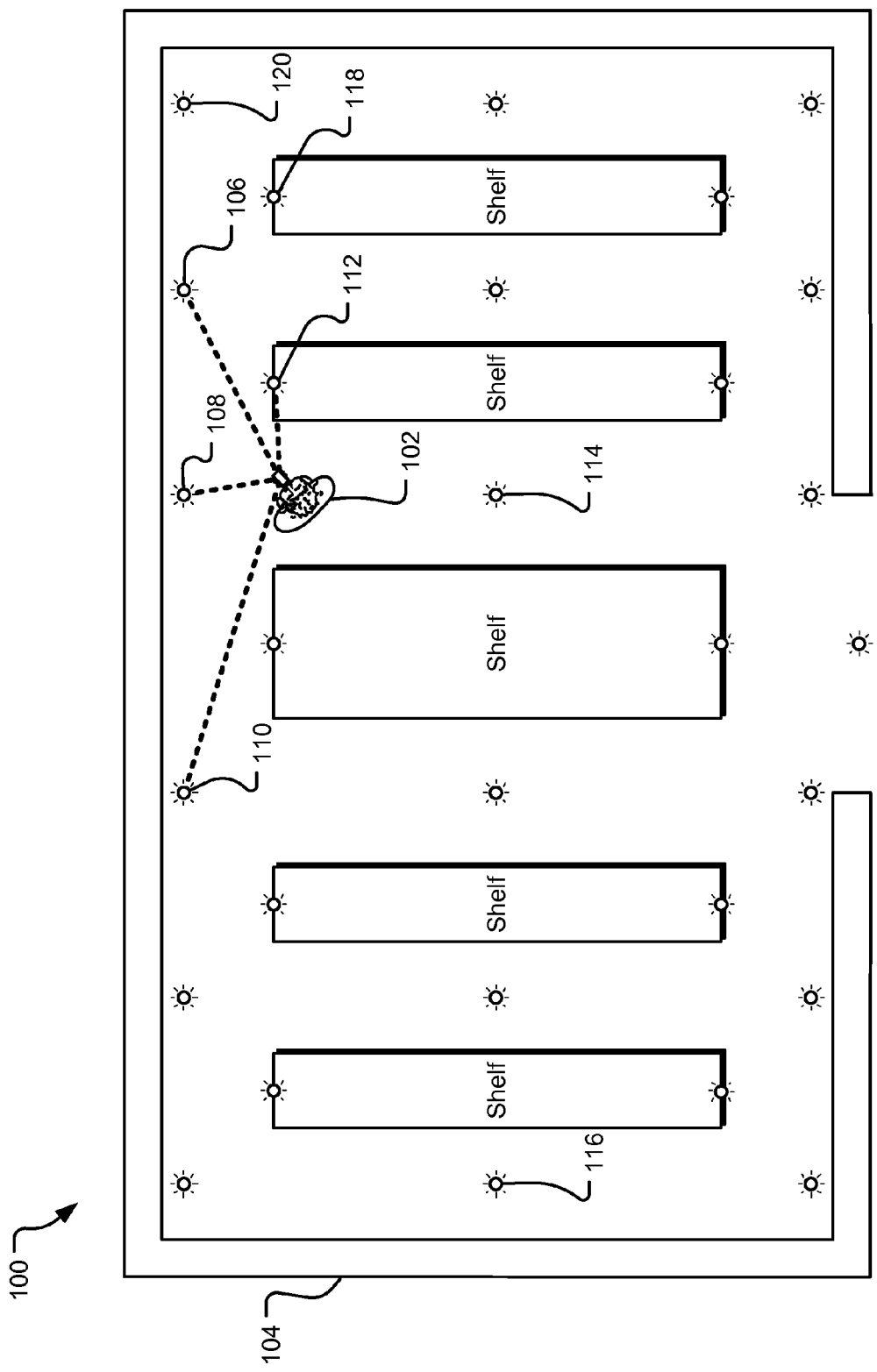
FIG. 1 illustrates an example scenario employing sound-based positioning.

Some modern mobile devices, such as smart phones, include microphones capable of detecting ultrasonic signals, which presents opportunities for using consumer-grade mobile devices to perform ultrasonic-based positioning. The ultrasonic bandwidth that is detectable by such devices is currently rather narrow (e.g., between 20 KHz and 22 KHz). Nevertheless, ultrasonic signals can be played within this limited bandwidth while providing sufficient information to allow position of a receiving device to be determined relative to the ultrasonic signal sources.

One implementation, for example, includes sound signal sources (e.g., speakers) distributed throughout a given area. The sound signals emitted by the sound signal sources are received by one or more receiving devices (e.g., mobile devices having microphones capable of accurately capturing ultrasonic sound signals), which use the received sound signals to compute a location within the given area. A receiving device can determine its initial position from the received sound signals using multilateration, a process of determining a position of a receiving device based on accurately computing the time difference of arrival (TDOA) of signals transmitted from multiple sound signal sources having known locations. In this manner, multilateration can be used to determine a position of a receiving device relative to a number of sound signal sources. Thereafter, given the initial position of the receiving device, it is possible to derive a time reference for each for the sound signals and therefore continue updating the position of the receiving device using non-differential time of arrival (TOA) measurements, particularly as the number of reliable sound signals drops (e.g., from changing obstructions and interference between a signal source and a receiving device).

Generally, one implementation of multilateration involves a receiving device that receives sound signals from multiple sound signal sources at known locations. Differences in the time of arrival of each sound signal, which can be normalized based on known transmission timeslots, are used to determine differences in the distances between the receiving device and each sound signal source. With two sound signal sources, the receiving device can be located on a hyperboloid. With three sound signal sources, the receiving device can be located on a second hyperboloid, wherein the intersection of the two hyperboloids describes a curve on which the receiving device lies. By adding a fourth sound signal source, the receiving device can be located on a third hyperboloid, wherein the intersection of the three hyperboloids defines a unique point in three-dimensional space.

It should be understood, however, that errors in the measurement of the time of arrival of sound signals can degrade the accuracy of the position computation (e.g., the hyperboloids computed based on the received sound signals rarely intersect at an exact point in space). Accordingly, additional sound signal sources and/or optimization techniques (e.g., a least squares method or an extended Kalman filter) can be applied to improve the accuracy of computed positioning results.

FIG. 1 illustrates an example scenario 100 employing sound-based positioning. A shopper 102 (an example user) is carrying a mobile phone executing a positioning application as he moves through a store 104 (an example environment). The body of the shopper 102 is directed toward the northeast of the store 104. Multiple sound signal sources (e.g., a speaker 106) are positioned throughout the store 104, each sound signal source emitting a sound signal in its own time slot (e.g., in a round-robin fashion). Each sound signal can be received by an audio input (e.g., a microphone) of a receiving device (e.g., the mobile phone), provided the sound signal is strong enough to be captured by the receiving device. For example, an ultrasonic sound signal emitted by the speaker 110 is captured by the receiving device, but the sound signal emitted by the speaker 116 is not strong enough to be captured by the receiving device by virtue of the speaker's distance from the receiving device. Furthermore, some sound signals are not received directly by the receiving device. For example, the body of shopper 102 blocks the direct sound signal path between the speaker 114 and the receiving device. Nevertheless, the receiving device may receive reflections of the sound signal from the speaker 114 off of the surrounding structures, such as the shelves, ceilings, and floors in the store. Reflected signals introduce additional distance along the sound signal path and therefore do not provide an accurate time of arrival measurement (without some type of normalization). In one implementation, the receiving device discerns between direct sound signals and reflected sound signals in order to omit the reflected sound signals from the positioning computation, although other implementations may be employed to account for certain types of reflections. For example, in one implementation, known geometric relationships between a sound signal source and a reflecting surface and between a receiving device and a reflecting surface may be used to calculate the physical distance between the sound signal source and the receiving device along the reflection path and, therefore, the direct physical distance between the sound signal source and the receiving device.

In another implementation, a sound-based positioning system can compute the set of possible intersections (positions) indicated by a number of captured sound signals, whether they are reflected or direct signals. In some circumstances, the set of positions made possible by the multiple captured signals can be narrowed by other constraints to suggest the most reliable signal sources to be used for the most accurate positioning.

As shown in FIG. 1, a sound-based positioning application executing on the receiving device carried by the shopper 102 receives direct sound signals from speakers 106, 108 110, and 112. It is also possible that the receiving device receives direct sound signals from other speakers, such as speakers 118 and 120, which can improve the accuracy and/or reliability of a positioning computation. Nevertheless, by receiving four reliable and direct sound signals, the receiving device can use differential time of arrival (DTOA) measurements and multilateration to compute its position relative to the signal sources within three-dimensional space, absent other information. Alternatively, the receiving device can use multilateration to compute its position relative to the signal sources within two-dimensional space based on three reliable and direct audio sources, absent other information. In the presence of additional information, such as positional constraints (i.e., the shopper 102 cannot be positioned on top of a shelf or outside the store 104) or positional approximations (e.g., the shopper 102 is assumed to be positioned in the middle of an aisle), the reliability and accuracy of the positioning computation can be enhanced and/or the number of signal sources required for the positioning computation can be reduced (such that a subset of previously used sound signal sources are used).

Once an initial position of the shopper 102 is determined using DTOA measurements and multilateration, the sound-positioning application can compute a timing reference for each sound signal (e.g., the times the corresponding sound signal source transmitted and/or stopped transmitting, based on the known distance between the sound signal source and the receiving device). Given these references, the sound-positioning application can switch to non-differential TOA measurements, allowing accurate positioning using fewer than the sound signal sources used in the multilateration stage. Accordingly, as the shopper 102 moves about the store, some previous direct sound signals will become blocked by the shopper's body, other shoppers, shelves, signage, etc. Nevertheless, the sound-positioning application can continue to capture sounds signals from various sound signal sources throughout the environment and accurately determine the shopper's position, even as the number of reliable sound signals varies.

Figure 2:
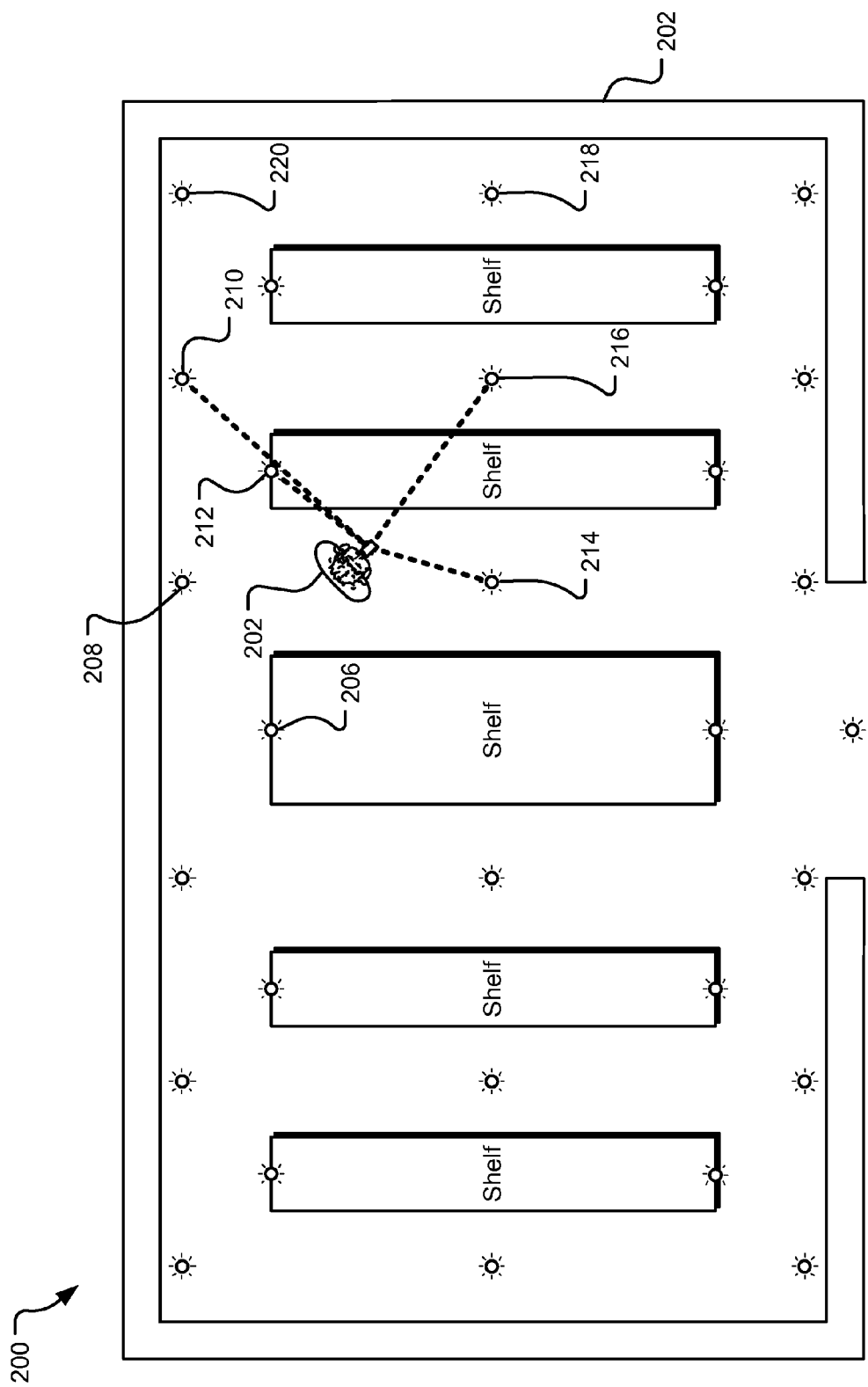
FIG. 2 illustrates another example scenario employing sound-based positioning.

FIG. 2 illustrates another example scenario 200 employing sound-based positioning in which a shopper 202 is located at a different location and orientation relative to multiple signal sources (e.g., a speaker 206) distributed throughout a store 204, each signal source emitting a sound signal that can be received by an audio input (e.g., a microphone) of a receiving device (e.g., the mobile phone). As with the scenario 100 shown in FIG. 1, the signal strength in the scenario 200 can affect which sound signals are captured by the receiving device. Furthermore, some sound signals are not received directly by the receiving device. For example, in contrast to FIG. 1, the body of shopper 202 is turned toward the southeast of the store 204. Accordingly the shopper's body blocks the direct sound signal paths between the receiving device and the speakers 206 and 208. Nevertheless, the receiving device may receive reflections of the sound signal off of the surrounding structures, such as the shelves, ceilings, and floors in the store. As such, the receiving device discerns between direct sound signals and reflected sound signals in order to omit the reflected sound signals from the positioning computation, or correctly accounts for the distance the signal has traveled based on the know geometric relationships of sound signal sources, reflecting surfaces, and the receiving device.

As shown in FIG. 2, the receiving device carried by the shopper 202 receives direct sound signals from speakers 210, 212, 214, and 216 in their assigned time slots. It is also possible that the receiving device receives direct sound signals from other speakers, such as speakers 218 and 220, which can improve the accuracy and/or reliability of a positioning computation.

As shown with respect to FIGS. 1 and 2, movement of a receiving device throughout a given area can alter in real-time the signal sources upon which the receiving device can base a positioning computation. Furthermore, the existence of reflected sound signals within the environment further complicates the selection of reliable sound signals suitable for use in positioning computations. Accordingly, the receiving device and/or a positioning system upon which it relies filters out unreliable sound signals in the environment and excludes their signal sources from positioning computations.

Figure 3:
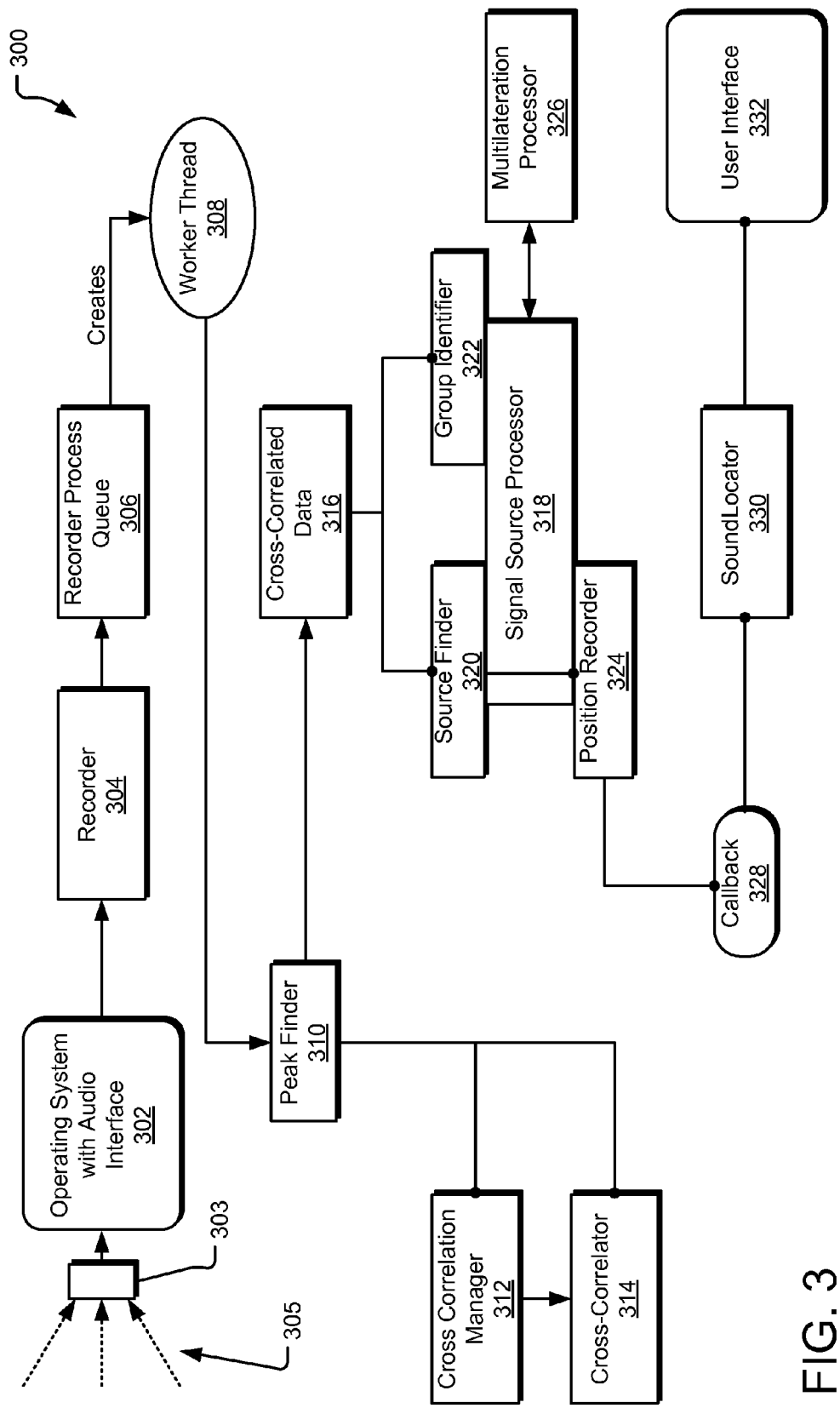
FIG. 3 illustrates an example data flow diagram for sound-based positioning.

FIG. 3 illustrates an example data flow diagram 300 for sound-based positioning. A receiving device, such as a mobile phone, executes an operating system 302 to manage its resources and provide a platform upon which a sound-based positioning application can be run. For example, in one implementation, a mobile device executes an operating system with an audio interface that manages the audio resources of the mobile device, such as a microphone 303 and one or more speakers (not shown), and executes a mobile positioning application capable of receiving sounds signals for multiple sound signal sources positioned throughout an area (e.g., a store, a warehouse, a manufacturing floor, an office building, etc.). It should be understood that, although the described technology is suitable for indoor use where standard GPS signals are blocked by an enclosing structure, the described technology may also be used in outdoor areas and may be used in combination with GPS and Wi-Fi technology.

When the sound-based positioning application is executing, a recorder 304, such as a processor-executable software facility, records and digitizes sound signals 305 captured by the microphone 303. The recorder 304 stores the digitized sound signals into a recorder process queue 306, where the recorded sound signal is split into sound signal blocks for streaming Fast Fourier Transform (FFT) processing. In one implementation, the block size is on the order of 2048 audio samples long, although other blocks sizes may be employed.

The recorder process queue 306 spawns a worker thread 308 that processes the sound signal blocks that are dequeued from the record process queue 306 for asynchronous processing. The worker thread 308 executes a peak finder 310, which processes each sound signal block processed by the worker thread 308. The peak finder 310 employs a cross-correlation manager 312 and a cross-correlator 314 to cross-correlate each sound signal block with a known transmitted signal to identify strong peaks in the correlated output. Cross correlation refers to a measure of similarity between two waveforms. One implementation, for example, delays one of the waveforms and then multiples the waveforms together. By finding a correlation peak that has a particular shape and is above a predetermined threshold (e.g., a reliability condition) when compared to other correlation results, the positioning system omits signals that are excessively delayed by reflections (e.g., which result in a longer path that is detectable at the speed of sound). The cross-correlation manager 312 provides a housekeeping function to the cross-correlator 314, which performs the cross-correlation operations and output cross-correlated data 316 as a queue of processed (e.g., cross-correlated) sound signals (e.g., correlation peaks).

The cross-correlated data 316 is processed by a signal source processor 318, which identifies the sound signal sources (e.g., speakers) from which the sound signals are received and the position of the signal sources. A source finder 320 of the signal source processor 318 determines an identification number of each correlation peak, thereby associating the correlation peak with a known signal source. In one implementation, signal sources are associated in signal source groups (e.g., between 8 and 16 speakers in one signal source group). A group identifier 322 identifies a signal source group in which the identified signal source is a member. A position recorder 324 associates the found signal source identifier with the corresponding audio timing of the sound signal (e.g., when the sound signal started relative to the start of the sound signal block).

A multilateration processor 326 receives a set of identified signal sources and their respective timings, the set of known signal source locations, and any geometric constraints (e.g., aisles in a store) and estimates the position of the receiving device from this data using a multilateration operation. A callback utility 328 asynchronously calls the sound locator 330, which translate the user location and relative X/Y/Z coordinates into the coordinate system of the application floor plan map for presentation to a user via a user interface 332 (e.g., which can display the floor plan map and user location on a display).

A variety of signal source identification schemes may be employed depending on the scale of the environment (e.g., the number of signal sources, the number of receiving devices supported simultaneously, and other environmental factors), although other schemes are contemplate beyond those disclosed herein. For example, in a small-scale environment (e.g., 8-16 signal sources), a tone can be used to identify an individual signal source. In one implementation, each signal source is identified by a locally unique tone and a set of tones spaced in intervals of 100 Hz from 20.1 KHz to 21.6 KHz. In one example, each signal source emits a waveform including a chirp and a tone, such that, for example:

$$\text{waveform}(i) = \text{chirp} + \text{tone}(i),$$

where i represents a signal source identifier; the chirp has a length of 2048 audio samples and is modulated by a frequency that increases linearly from 20 KHz to 21.6 KHz (an example "up-chirp"); and the tone represents a sinusoidal waveform having a locally unique frequency at $20.1+i*0.1$ KHz. Alternatively, a "down-chirp" may be employed, using a linearly decreasing frequency. Other waveforms may be employed, as described with regard to other scales.

In a medium-scale environment (e.g., 16-64 signal sources), for example, three approaches are described below, although others may also be used. In one approach, 16 tones are used to identify an individual signal source. The signal sources are divided into 2 groups of signal sources, scaling to up to 32 signal sources, such that, for example:

$$\text{waveform}(i,j) = \text{chirp}(j) + \text{tone}(i),$$

where j represents the group identifier (j=0=>up-chirp from 20 KHz to 21.6 KHz and j=1=>down-chirp from 21.5 KHz to 20.0 KHz); the cross-correlation between chirps is determined based on a threshold<0.2 (a reliability condition); chirp lengths are 2048 audio samples long; i represents a signal source identifier; and the tone represents a sinusoidal waveform having a locally unique frequency at $20.1+i*0.1$ KHz.

In another approach for a medium-scale environment, 16 tones are again used to identify a single signal source. The signal sources are divided into 4 groups of signal sources, scaling to up to 64 signal sources, such that, for example:

$$\text{waveform}(i,j) = \text{chirp}(j) + \text{tone}(i),$$

where j represents the group identifier (j=0=>up-chirp from 20 KHz to 20.8 KHz, j=1=>up-chirp from 20.8 KHz to 21.6 KHz, j=3=>down-chirp from 21.6 KHz to 20.8 KHz, and j=4=>down-chirp from 20.8 KHz to 20 KHz); the cross-correlation between chirps is determined based on a threshold<0.3 (a reliability condition); chirp lengths are 2048 audio samples long; i represents a signal source identifier; and the tone represents a sinusoidal waveform having a locally unique frequency at $20.1+i*0.1$ KHz.

In yet a third approach for a medium-scale environment, the utilized bandwidth is again split into two frequency ranges (e.g., 20 KHz to 20.8 KHz and 20.8 KHz to 21.6 KHz, both at 100 Hz intervals) to scale to 64 signal sources. A tone is encoded in the first frequency range to indicate one of 8 signal sources and another tone is encoded in the second frequency range to indicate one of 8 groups, such that, for example:

$$\text{waveform}(i,j) = \text{chirp} + \text{tone}(i) + \text{tone}(j),$$

where j represents a group identifier and i represents a signal source identifier; tone(i) is a sinusoidal signal at a frequency $20.1+i*0.1$ KHz; tone(j) is a sinusoidal signal at a frequency $20.9+j*0.1$ KHz; the cross-correlation between chirps is determined based on a threshold<0.3 (a reliability condition); and the chirp length is 2048 audio samples long.

For a large-scale environment (e.g., 64-256 signal sources), for example, three approaches are described below, although others may also be used. In one approach, 16 pseudo-noise coded (PNC) waveforms are used to encode 16 signal source identifiers, each waveform spanning a frequency range (e.g., 20.0 KHz to 21.6 KHz). In addition, 16 tones distributed over a frequency range (e.g., 20.0 KHz to 21.6 KHz) to encode 16 group identifiers, such that, for example:

$$\text{waveform}(i,j) = \text{PNC}(i) + \text{tone}(j),$$

where j represents a group identifier and i represents a signal source identifier; tone(j) is a sinusoidal signal at a frequency $20.1+j*0.1$ KHz; the cross-correlation between PNC waveforms is based on a threshold of ~0.2-0.4; and the PNC waveform length is 2048 audio samples.

In another approach for a large-scale environment, the utilized bandwidth is again split into two frequency ranges (e.g., 19.0 KHz to 20.4 KHz with a center frequency ($f_c$) at 19.7 KHz and 20.4 KHz to 21.8 KHz with a center frequency ($f_c$) at 21.1 KHz). In the first band, 16 PNC waveforms are used to encode 16 group identifiers. In the second band, 16 PNC waveforms are used to encode 16 signal source identifiers for in a second group, such that, for example:

$$waveform(i,j)=PNC(I,f_c=19.7\text{ KHz})+PNC(j,f_c=21.1\text{ KHz}),$$

where j represents a group identifier and i represents a signal source identifier; the cross-correlation among PNC waveforms is based on a threshold of ~0.2-0.4; and the PNC waveform length is 2048 audio samples.

In yet another approach for a large-scale environment, the utilized bandwidth is again split into two frequency ranges (e.g., 20 KHz to 20.8 KHz and 20.8 KHz to 21.6 KHz, both at 100 HZ intervals) to scale to 256 signal sources. A tone is encoded in the first frequency range to indicate one of 8 signal sources and another tone is encoded in the second frequency range to indicate one of 8 groups. In addition, the signal sources are divided into 4 super-groups of signal sources, such that, for example:

$$waveform(i,j,k)=chirp(k)+tone(i)+tone(j),$$

where i represents a super-group identifier (k=0=>up-chirp from 20 KHz to 20.8 KHz, k=1=>up-chirp from 20.8 KHz to 21.6 KHz, k=3=>down-chirp from 21.6 KHz to 20.8 KHz, and k=4=>down-chirp from 20.8 KHz to 20 KHz); the cross-correlation between chirps is determined based on a threshold<0.3 (a reliability condition); chirp lengths are 2048 audio samples; i represents a signal source identifier; the tone(i) represents a sinusoidal waveform having a locally unique frequency at 20.1+i*0.1 KHz.; j represents a group identifier; and the tone(j) represents a sinusoidal waveform having a locally unique frequency at 20.9+j*0.1 KHz.

For a mega-scale environment (e.g., 256-1024 signal sources), 16 pseudo-noise coded (PNC) waveforms are used to encode 16 signal source identifiers, each waveform spanning a frequency range (e.g., 20.0 KHz to 21.6 KHz). In addition, 16 tones distributed over a frequency range (e.g., 20.0 KHz to 21.6 KHz) to encode 16 group identifiers, such that, for example:

$$waveform(i,j,k)=PNC(i)+tone(j)+tone(k),$$

where k represents a super-group identifier; j represents a group identifier; i represents a signal source identifier; tone(j) is a sinusoidal signal at a frequency 20.1+j*0.1 KHz; and tone(k) is a sinusoidal signal at a frequency 20.9+k*0.1 KHz.

Another option for expanding the scope of the supported environment involves designating each sound signal source in a given area with a unique identifier. Each sound signal source emits its group identifier after which the individual signal sources emit their signal source identifiers in a round-robin sequence with the signal sources within that group. For example, consider a two-story building, where signal sources on the first floor are in different group as compared to the signal sources on the second floor. Accordingly, the initial group identifier signal indicates the floor on which the receiving device is positioned, and the subsequent sequence of signal source identifiers indicates the signal sources on that floor from which the signals are being captured. In this manner, signal sources identifiers can be shared among different flows, distinguished by the indicated group identifier.

Using these or other encoding schemes, a signal source can be identified using a variety of detection methods. In one approach, a brute force method obtains a full scale cross-correlation of captured sound signals with each of the N waveforms and selects the waveform with the largest correlation peak. In another approach, waveforms are maintained in a bandwidth of 1600 HZ, providing about 150 frequency bins (e.g., sub-ranges) in the spectral domain. A 256-point Fast Fourier Transform (FFT) can be sufficient to perform cross-correlation. After identifying the waveform having the largest correlation peak from the FFT cross-correlation, a full length cross correlation with the reference function of the identified waveform can be performed, thereby identifying the sound signal sources based on the sound signal received.

In the case of waveforms with embedded tones, Doppler extraction can be used to determine direction and/or velocity of travel of the receiving device and/or the user holding the receiving device. In one implementation, Doppler extraction involves a measure of the shift of the location of the tone in the frequency domain compared to the frequency location of the embedded tones.

In another implementation involving a pseudo-noise code (PNC) waveform, the Doppler shift can be iteratively determined by shifting the spectrum of the PNC waveforms by one or more frequency bins, multiplying with the spectrum of the recorded sound signal, performing a short length (e.g., 256) inverse fast Fourier transform (IFFT), and noting the peak of the resulting cross-correlation signal. The value of the frequency bin shift that maximizes the cross-correlation peak represents a Doppler shift in the recorded sound signal.

In yet another implementation involving multiple PNC waveforms, the procedure is repeated in two dimensions, namely PNC waveform identifiers and bin shift. The pair of the PNC waveform identifier and the bin shift that maximizes the cross-correlation peak yields both the PNC waveform transmitted by the sound signal source as well as the Doppler shift in the recorded sound signal.

Other Doppler extraction techniques may also be employed. As described, the Doppler shift, in combination with incremental location determinations, can be used to determine the receiving devices (and/or the user's) direction and/or velocity of travel, so as to set constraints on the user's movement. As such, Doppler extraction allows prediction of the receiving device's possible positions at a time after which the sound signal is detected, which can be used as a constraint. Such constraints can be used to improve the positioning accuracy and/or to reduce the number of reliable sound signals required to accurately determine location.

Figure 4:
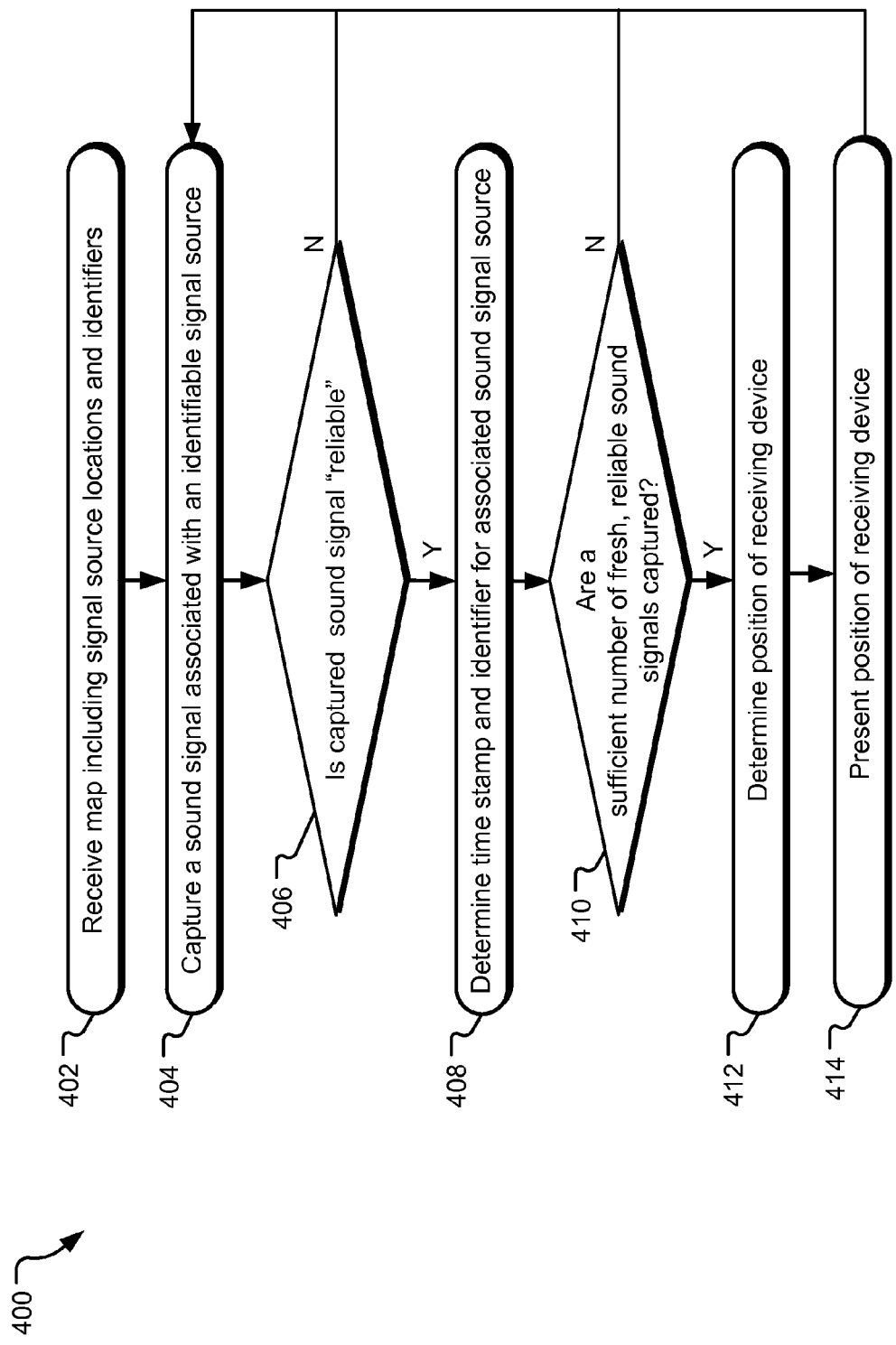
FIG. 4 illustrates example operations for sound-based positioning.

FIG. 4 illustrates example operations 400 for sound-based positioning. A receiving operation 402 identifies an environment, such as a store, and receives a map of the environment, including signal source locations, their identifiers, their group identifiers, and other environmental constraints (e.g., where the receiving device can realistically be positioned). In one implementation, the receiving operation 402 executes when a sound-based positioning application is initiated on a receiving device. In an alternative implementation, the receiving operation 402 detects that the receiving device has entered a known environment (e.g., based on a last known GPS position, based on a recognized Wi-Fi router MAC address, based on user input), and retrieves the map from its own storage or from an external data source (e.g., a Wi-Fi connected service).

A capture operation 404 captures a sound signal associated with an identifiable signal source. Each signal source emits a sound signal in its own timeslot according to a signaling protocol, such as those described with regard to the small, medium, large, and mega scale environments above. The received signal is processed to identify the signal source and evaluate its reliability. For example, using cross-correlation of the captured signal with each of the waveform supported in the environment, a capture operation 404 can select the waveform that yields the largest correlation peak to identify the sound signal source of the captured sound signal.

A decision operation 406 determines whether the captured sound signal is reliable (e.g., a direct sound signal of sufficient strength to be accurately decoded). If not, the capture signal is ignored and a new sound signal is captured in the capture operation 404. Otherwise, determining operation 408 determines the capture timestamp and the identity of the associated sound signal source using the cross-correlation result.

Another decision operation 410 determines whether a sufficient number of fresh, reliable sound signals have been captured. A reliability condition having one or more components is applied against the captured sounds signals. For example, one component may consider the shape of the sound signal waveform to assist in evaluating whether the captured sounds signal is direct or reflected. A direct sound signal tends to have different characteristics than a reflected sound signal, which can be discerned using various techniques including without limitation cross-correlation, Doppler extraction, etc. Furthermore, the component may evaluate a sound signal captured during the same timeslot in each cycle of sound signals. The sound signals captured during the same time slot do not cross-correlate well with each other, and it may be determined that one or more of the sound signals captured during the timeslots are reflected and therefore not reliable. Yet another component may consider whether the multilateration converges at or very close to a single point. Divergence in the multilateration solution may indicate that one of the component sound signals is not direct and therefore not reliable. Other components may also be employed in the reliability condition.

In another perspective, a sound signal may be deemed "stale" or "not fresh enough" if the tracking time between a first sound signal and a last sound signal is greater than a certain threshold (e.g., in seconds). For example, as sound signals are received from various sound signal sources in a sequence of time slots, collecting a sufficient number reliable sound signals to multilaterate may occur over a period of many time slots (e.g., enough for the receiving device to have moved a non-negligible distance between the first reliable sound signal and the last reliable time signal). Accordingly, the accuracy of the position computation may be impaired if the receiving device moves too far during this "tracking" time. In one implementation, the decision operation 410 determines whether a sound signal block is stale (e.g., to old to contribute to an accurate position computation) and, therefore, unreliable. Stale sound signal blocks can be ignored.

Furthermore, the determination about whether a sound signal is stale can be informed by a variety of factors (e.g., whether the user exhibits a Doppler shift indicating movement to cause a non-trivial change in position during the tracking time, whether the identity of direct and blocked signal sources changes, heuristics pertaining to shopper movement, etc.). For example, if the user does not show significant velocity based on a Doppler shift measurement of reflected sound signals, if the direct and blocked signal sources remain unchanged during the tracking time, and/or if the location of shoppers are statistically known to be acceptably accurate given the tracking time does not exceed a tracking threshold, then the sound signal may be deemed sufficiently "fresh."

In addition, environmental constraints may also be applied to reduce the number of fresh, reliable sound signals needed to accurately compute position based on DTOA. For example, if three fresh, reliable sound signals are captured (when a three-dimensional multilateration typically calls for four reliable sounds signals) an assumption is made that the receiving device is assumed to be within a predefined height range, then two-dimensional positioning may be sufficient and a fourth fresh, reliable sound signal is not required. Likewise, if the shoppers assumed to be in the center of the aisle within acceptable tolerance, then the number of fresh, reliable sound signals required for accurate positioning may be reduced. Other environmental constraints may likewise reduce the number of fresh, reliable sound signals required and/or improve the accuracy and reliability sound-based positioning results.

Yet another environmental constraint that may be employed to reduce the number of fresh, reliable sound signals needed relates to a sequence of position results over a period of time. If the receiving device maintains a list of its most recent positions (and potentially, its velocities), it may assume that its direction (and/or velocity) of travel will not have changed more than a certain amount between any position computations. For example, if the receiving device has several position results indicating that the receiving device is moving North at one mile per hour in immediately previous cycles, then a constraint may be assumed that prevents the next position of the receiving device to be outside of a previous range from the previous position result.

Yet another environmental constraint may be the knowledge of how far a user may have traveled in a given time period, assuming either the fastest velocity a user can achieve or a typical fastest velocity of a casual user in an environment (e.g., a store). The distance traveled may additionally take into account the constraints of walking in the real physical environment such as along the user pathways as opposed to jumping over shelves.

A positioning operation 412 uses multilateration to determine the position of the receiving device relative to the known locations the sound signal sources, based on the fresh, reliable sound signals capture by the receiving device, the DTOA of the captured signals, and the received map, and the sound signal source locations and identifiers. A presentation operation 414 presents an indication of the computed position within a map on the user interface.

Figure 5:
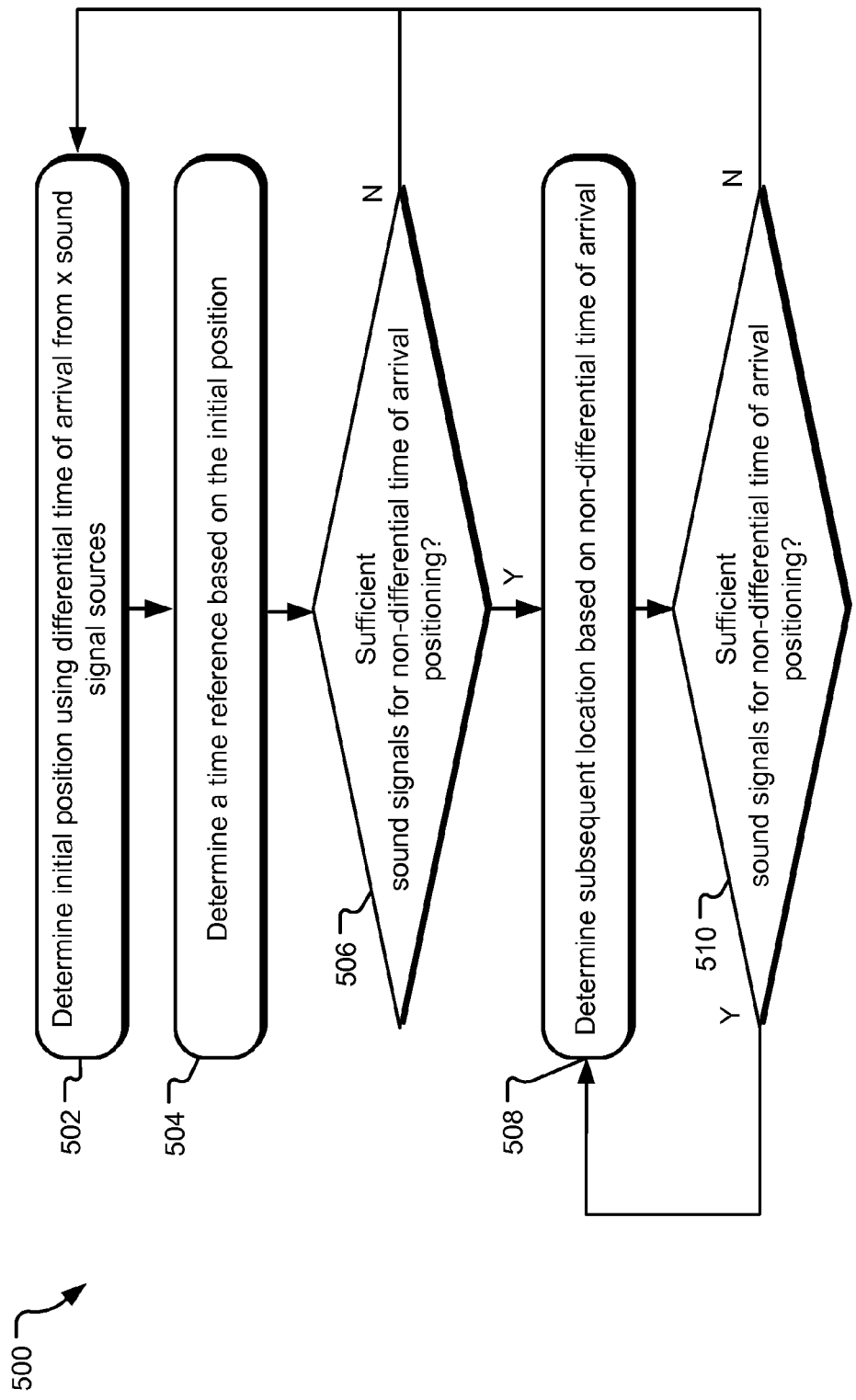
FIG. 5 illustrates example operations for sound-based positioning using differential time of arrival and non-differential time of arrival.

FIG. 5 illustrates example operations 500 for sound-based positioning using differential time of arrival and non-differential time of arrival. A determination operation 502 determines initial position of the receiving device using differential time of arrival from x sound signal sources, in a process similar to that described with regard to FIG. 4. A timing operation 504 determines a time reference based on the initial position and the distances between the initial position and each of the sound signal sources emitting the captured reliable sound signals. Given these distances, the transmission time of each sound signal can be computed, thereby yielding a timing reference for each sound signal.

A decision operation 506 determines whether insufficient number of fresh, reliable sound signals for non-differential time of arrival positioning have been captured. In this operation, the timing reference for each sound signal makes it possible to perform non-differential TOA measurements, thereby reducing the number of reliable sound signals needed to accurately determine the position of the receiving device relative to emitting sound signal sources. Another determining operation 508 determines a subsequent location based on non-differential TOA measurements and the timing references. Another decision operation 510 retests the number of fresh, reliable sound signals captured in a subsequent cycle to determine whether non-differential time of arrival positioning may still be accurately computed, in which case processing proceeds to the determining operation 508. Otherwise, processing proceeds to the determination operation 502 to determine a new position using DTOA.

Figure 6:
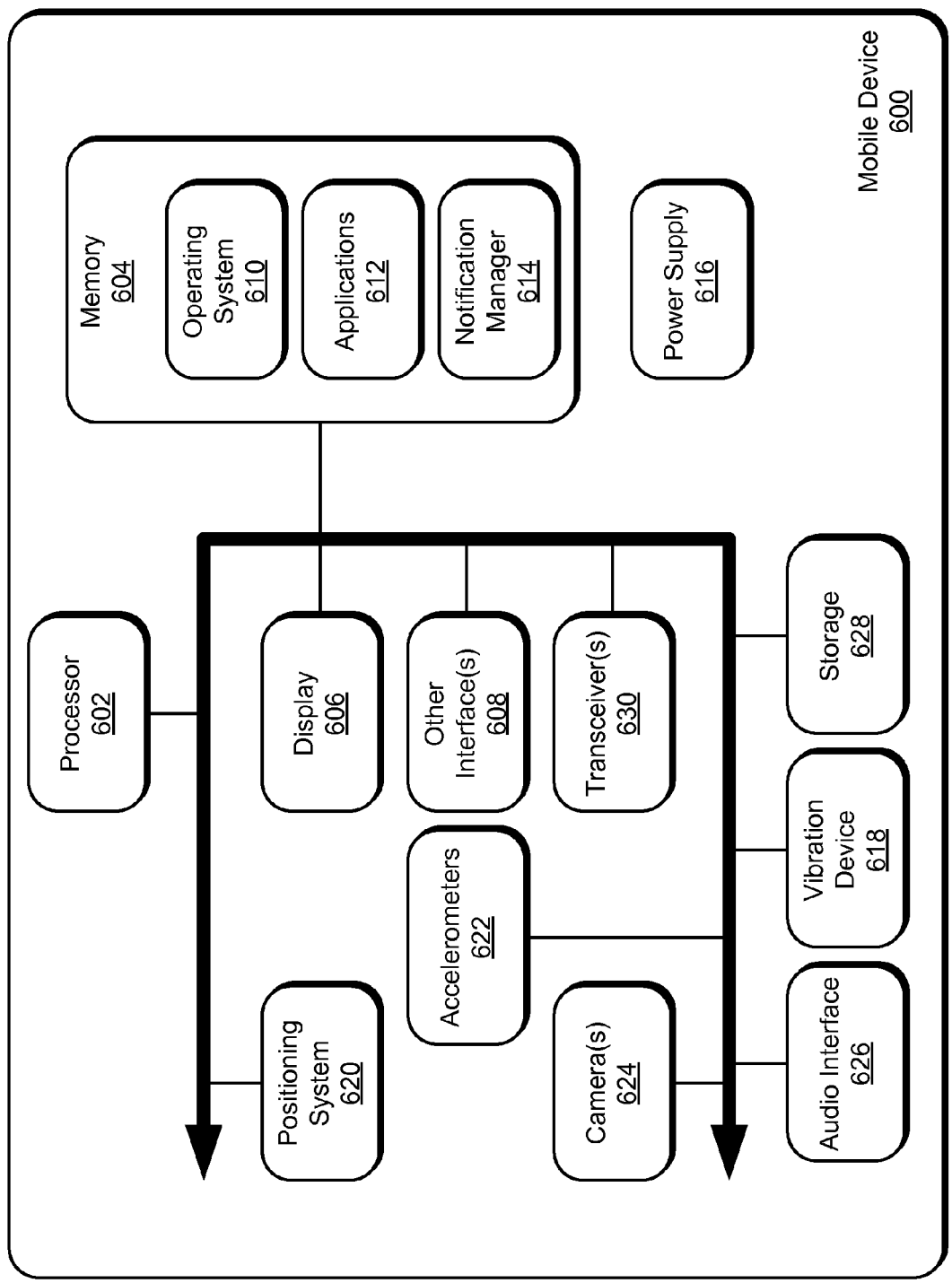
FIG. 6 illustrates another example system that may be useful in implementing the described technology.

FIG. 6 illustrates another example system (labeled as a mobile device 600) that may be useful in implementing the described technology. The mobile device 600 includes a processor 602, a memory 604, a display 606 (e.g., a touchscreen display), and other interfaces 608 (e.g., a keyboard). The memory 604 generally includes both volatile memory (e.g., RAM) and non-volatile memory (e.g., flash memory). An operating system 610, such as the Microsoft Windows® Phone 7 operating system, resides in the memory 604 and is executed by the processor 602, although it should be understood that other operating systems may be employed.

One or more application programs 612 are loaded in the memory 604 and executed on the operating system 610 by the processor 602. Examples of applications 612 include without limitation email programs, scheduling programs, personal information managers, Internet browsing programs, multimedia player applications, etc. A notification manager 614 is also loaded in the memory 604 and is executed by the processor 602 to present notifications to the user. For example, when a promotion is triggered and presented to the shopper, the notification manager 614 can cause the mobile device 600 to beep or vibrate (via the vibration device 618) and display the promotion on the display 606.

The mobile device 600 includes a power supply 616, which is powered by one or more batteries or other power sources and which provides power to other components of the mobile device 600. The power supply 616 may also be connected to an external power source that overrides or recharges the built-in batteries or other power sources.

The mobile device 600 includes one or more communication transceivers 630 to provide network connectivity (e.g., mobile phone network, Wi-Fi®, Bluetooth®, etc.). The mobile device 600 also includes various other components, such as a positioning system 620 (e.g., a global positioning satellite transceiver), one or more accelerometers 622, one or more cameras 624, an audio interface 626 (e.g., a microphone, an audio amplifier and speaker and/or audio jack), and additional storage 628. Other configurations may also be employed.

In an example implementation, a sound-based positioning application, a peak finder, a cross correlation manager, a cross-correlator, a worker thread, a sound locator, a user interface, a multilateration processor, and other modules and services may be embodied by instructions stored in memory 604 and/or storage devices 628 and processed by the processing unit 602. Sound signal blocks, positions, floor plan maps, respective timings, and other data may be stored in memory 604 and/or storage devices 628 as persistent datastores. It should be understood that device storage may be local (e.g., flash memory or a magnetic storage device) or remote (e.g., via a network-attached storage device, such as a DVD, a CD, or a magnetic storage device).

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:

receiving by a receiving device at a first location a sound signal from each of a set of sound signal sources, the sound signal emitting from each sound signal source being distinct from the sound signal emitting from another sound signal source and each sound signal source being uniquely identifiable within the set based on information provided in the sound signal;

selecting sound signals received from a subset of the sound signal sources, the selected sound signals satisfying a reliability condition that filters out reflected sound signals, the location of each sound signal source providing a selected sound signal being known to the receiving device;

determining the first location of the receiving device relative to the known locations of the subset of sound signal sources using a differential time of arrival measurement and cross-correlation; and determining a second location of the receiving device based on non-differential time of arrival measurements of sound signals received at the second location from fewer than the subset of sound signal sources received at the first location.

2. The method of claim 1 wherein the operation of determining the second location comprises:
determining a timing reference of each captured sound signal based on a distance computed between the first location and locations of each of the sound signal sources in the subset.

3. The method of claim 1 wherein the operation of determining the second location comprises:
determining a direction of travel for the receiving device; and
evaluating the first location and the non-differential time of arrival measurement against the direction of travel to determine the second location.

4. The method of claim 3 wherein the operation of determining the direction of travel comprises:
evaluating a plurality of previously determined locations of the receiving device.

5. The method of claim 4, wherein
the previously determined locations are determined based on sound-based positioning.

6. The method of claim 1 wherein the operation of determining the second location comprises:
determining a speed of travel of the receiving device; and
evaluating the first location and the non-differential time of arrival measurement against the speed of travel to determine the second location.

7. The method of claim 6 wherein the operation of determining the speed of travel comprises:
determining a Doppler shift in frequencies of sound signals received from the first location to determine the speed of travel of the receiving device.

8. The method of claim 1 wherein the receiving device is a mobile device and the sound signal sources are stationary.

9. A system comprising:
a recorder of a receiving device configured to capture at first location sound signals emitted from a set of sound signal sources, an individual sound signal emitted from an individual sound signal source being distinct from another individual sound signal emitted from another it sound signal source and each sound signal source being uniquely identifiable within the set based on information provided in respect individual emitted sound signals;
a signal source processor of the receiving device configured to select a subset of the sound signals received from a subset of the sound signal sources, the selected sound signals satisfying a reliability condition that filters out reflected sound signals, a location of each sound signal source providing a selected individual sound signal being known to the receiving device; and
a sound locator of the receiving device configured to determine the first location of the receiving device relative to the known locations of the subset of sound signal sources using a differential time of arrival measurement and cross-correlation, wherein sound locator is further configured to determine a second location of the receiving device based on non-differential time of arrival measurements of further sound signals received at the second location from fewer than the subset of sound signal sources received at the first location.

10. The system of claim 9 wherein the receiving device is a mobile device and the sound signal sources are stationary.

11. One or more processor-readable storage media encoding processor-executable instructions for executing on an electronic device a processor-executable process, the process comprising:

receiving by a receiving device at a first location sound signals from each of a set of sound signal sources, an individual sound signal emitted from an individual sound signal source being distinct from another individual the sound signal emitted from another individual sound signal source and each sound signal source being uniquely identifiable within the set based on information provided in a respectively emitted individual sound signal;
selecting a subset of the sound signals received from a subset of the sound signal sources, the selected subset of the sound signals satisfying a reliability condition that filters out reflected sound signals, a location of each sound signal source providing an individual selected sound signal of the subset of the sound signals being known to the receiving device;
determining the first location of the receiving device relative to the known locations of the subset of sound signal sources using a differential time of arrival measurement and cross-correlation; and,
determining a second location of the receiving device based on non-differential time of arrival measurements, the non-differential time of arrival measurements based on further sound signals at the second location from at least some of the subset of the sound signals sources.

12. The one or more processor-readable storage media of claim 11 wherein the operation of determining the second location comprises:
determining a timing reference of the sound signals based on a distance computed between the first location and locations of each of the sound signal sources in the subset.

13. The one or more processor-readable storage media of claim 11 wherein the operation of determining the second location comprises:
determining a direction of travel for the receiving device; and
evaluating the first location and the non-differential time of arrival measurements against the direction of travel to determine the second location.

14. The one or more processor-readable storage media of claim 13 wherein the operation of determining the direction of travel comprises:
evaluating a plurality of previously determined locations of the receiving device, the previously determined locations being determined based on sound-based positioning.

15. The one or more processor-readable storage media of claim 11 wherein the operation of determining the second location comprises:
determining a speed of travel of the receiving device; and
evaluating the first location and the non-differential time of arrival measurements against the speed of travel to determine the second location.

16. The one or more processor-readable storage media of claim 15 wherein the operation of determining the speed of travel comprises:
determining a Doppler shift in frequencies of the sound signals received from the first location to determine the speed of travel of the receiving device.

17. The one or more processor-readable storage media of claim 11 wherein the receiving device is a mobile device and the sound signal sources are stationary.

* * * * *